(12) United States Patent
Koyama

(10) Patent No.: US 11,486,467 B2
(45) Date of Patent: Nov. 1, 2022

(54) LINK PLATE

(71) Applicant: TSUBAKIMOTO CHAIN CO., Osaka (JP)

(72) Inventor: Masahiro Koyama, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 370 days.

(21) Appl. No.: 16/887,709

(22) Filed: May 29, 2020

(65) Prior Publication Data

US 2020/0386297 A1 Dec. 10, 2020

(30) Foreign Application Priority Data

Jun. 7, 2019 (JP) .............................. JP2019-106842

(51) Int. Cl.
*F16G 15/12* (2006.01)
(52) U.S. Cl.
CPC .................................... *F16G 15/12* (2013.01)
(58) Field of Classification Search
CPC .......... F16G 15/12; F16G 13/02; F16G 13/06; F16H 7/06
USPC ....................................................... 474/206
See application file for complete search history.

(56) References Cited

U.S. PATENT DOCUMENTS

| | | | |
|---|---|---|---|
| 6,220,981 B1* | 4/2001 | Yoshida | F16G 13/06 474/212 |
| 2009/0017951 A1 | 1/2009 | Tohara et al. | |
| 2010/0267504 A1* | 10/2010 | Miyazawa | F16G 13/04 474/140 |
| 2011/0263369 A1* | 10/2011 | Kurihara | F16G 13/02 474/206 |
| 2012/0316020 A1* | 12/2012 | Miyazawa | F16G 13/06 474/230 |
| 2013/0196804 A1* | 8/2013 | Bodensteiner | F16G 13/02 474/148 |
| 2016/0116022 A1* | 4/2016 | Yokoyama | F16G 13/04 59/84 |

FOREIGN PATENT DOCUMENTS

| | | |
|---|---|---|
| JP | 11-236949 A | 8/1999 |
| JP | 2009-19749 A | 1/2009 |
| JP | 2010-249240 A | 11/2010 |
| JP | 2011-231822 A | 11/2011 |
| JP | 2012-255523 A | 12/2012 |

\* cited by examiner

*Primary Examiner* — Michael R Mansen
*Assistant Examiner* — Mark K Buse
(74) *Attorney, Agent, or Firm* — WHDA, LLP

(57) ABSTRACT

To provide a versatile and easy-to-produce link plate that can reduce frictional resistance and keep surface pressure low while maintaining a small height of a guide-side end surface, and can secure a tensile strength, and a chain. The guide-side end surface of the link plate is made up of a flat portion formed by a flat surface parallel to a line connecting centers of connection holes at leading and trailing ends, and both end surface portions on both ends in the chain longitudinal direction of the flat portion. The both end surface portions are formed to come closer to the line connecting the centers of the leading-end and trailing-end connection holes as the both end surface portions extend further from the flat portion.

6 Claims, 2 Drawing Sheets

LINK PLATE

BACKGROUND OF THE INVENTION

1. Field of the Invention

The present invention relates to a link plate having connection holes at leading and trailing ends, a sliding contact part that makes sliding contact with a guide member, and a guide-side end surface in an area between centers of the leading-end and trailing-end connection holes along a chain longitudinal direction on one side where the link plate has the sliding contact part.

2. Description of the Related Art

Link plates, which have connection holes at leading and trailing ends and sliding contact parts that make sliding contact with guide members, of roller chains, bushing chains, silent chains and the like used in power transmission mechanisms of automobiles, industrial machines and the like have been known.

Link plates of a common chain have a guide-side end surface that is entirely flat in the area between the centers of leading-end and trailing-end connection holes along the longitudinal direction of the chain (chain pitch zone) on the side that has the sliding contact part. Therefore, the friction resistance increases while the surface pressure reduces, if the guide member that makes sliding contact with the chain has a flat surface, or a large radius of curvature.

Link plates designed with an attempt to reduce friction resistance have been known, wherein a concavely curved part is provided on the guide-side end surface, or the link plate has an irregular shape such as vertical asymmetry, and wherein the flow of lubricating oil is controlled (see, for example, Japanese Patent Applications Laid-open Nos. 2009-019749, H11-236949, 2010-249240, and 2011-231822).

A link plate with a shape that ensures the plate strength around connection holes to guarantee a certain tensile strength, while having convexly curved guide-side end surfaces to reduce friction resistance, has also been known (see, for example, Japanese Patent Application Laid-open No. 2012-255523).

SUMMARY OF THE INVENTION

While it is possible to optimize surface pressure and friction resistance with the link plates known from Japanese Patent Applications Laid-open Nos. 2009-019749, H11-236949, 2010-249240, and 2011-231822, etc., different designs are necessary in accordance with the environment in which the chain is used because of large variations caused by the viscosity and temperature of lubricating oil, and the surface conditions of the guide member. Moreover, since the link plates must be fabricated precisely as designed, the versatility was poor and the production cost was high.

The link plate known from Japanese Patent Application Laid-open No. 2012-255523 is highly effective in reducing friction resistance, but on the other hand required measures to eliminate adverse effects of wear marks and wear powder that were caused by increased surface pressure against the guide member.

Another problem was that the maximum height of the link plate had to be set larger than necessary to enhance the plate strength around connection holes.

The present invention solves the problems encountered by the prior art described above and provides a versatile and easy-to-produce link plate that can reduce frictional resistance and keep surface pressure low while maintaining a small height of a guide-side end surface, and can secure a tensile strength, and a chain.

The link plate according to the present invention includes: connection holes at leading and trailing ends; a sliding contact part that makes sliding contact with a guide member; and a guide-side end surface in an area between centers of the leading-end and trailing-end connection holes along a chain longitudinal direction on one side where the link plate has the sliding contact part. The guide-side end surface of the link plate includes a flat portion formed by a flat surface parallel to a line connecting centers of the leading-end and trailing-end connection holes, and both end surface portions on both ends in the chain longitudinal direction of the flat portion. The both end surface portions are formed to come closer to the line connecting the centers of the leading-end and trailing-end connection holes as the both end surface portions extend further from the flat portion. The problems described above are thereby solved.

According to the link plate set forth in claim 1 and to the chain set forth in claim 6, the guide-side end surface includes a flat portion formed by a flat surface parallel to a line connecting centers of the leading-end and trailing-end connection holes, and both end surface portions on both ends in the chain longitudinal direction of the flat portion. The both end surface portions are formed to come closer to the line connecting the centers of the leading-end and trailing-end connection holes as the both end surface portions extend further from the flat portion. This makes it possible to keep the surface pressure low while maintaining the friction reduction effect equivalent of the link plate having a guide-side end surface entirely convexly curved, and to keep the maximum height of the link plate low while securing the tensile strength.

Moreover, the simple shape allows for designing with little difficulty, enhances versatility, and makes the production easy.

According to the configuration set forth in claim 2, a distance (H/2) from the flat portion to the line connecting the centers of the leading-end and trailing-end connection holes is longer than a distance (R) from respective centers of connection holes to leading and trailing end edges of the link plate on the line connecting the centers of the leading-end and trailing-end connection holes. This allows a necessary plate width around the connection holes to be secured to ensure that the tensile strength is increased.

According to the configuration set forth in claim 3, the both end surface portions are a curved surface having a predetermined radius of curvature (RT), the radius of curvature (RT) of the both end surface portions being longer than a distance (R) from respective centers of connection holes to leading and trailing end edges of the link plate on the line connecting the centers of the leading-end and trailing-end connection holes. The smooth surface that continues from both end surface portions to the flat portion enables the chain to smoothly enter into the guide member, as a result of which it is possible to reduce impact and noise.

According to the configuration set forth in claim 4, the flat portion has a length (L) along the chain longitudinal direction that is 50% or less of a length (P) between the centers of the leading-end and trailing-end connection holes. This makes it possible to reliably achieve the friction reduction effect equivalent of the link plate having a guide-side end surface entirely convexly curved.

According to the configuration set forth in claim 5, the both end surface portions have a connecting point with the flat portion where the both end surface portions each smoothly continue from the flat portion, the flat portion being a tangential line at the connecting point. This makes it possible to suppress changes in sliding resistance of the guide member even when the link plates vibrate or their attitude changes, and allows for stable sliding movement.

DESCRIPTION OF THE PREFERRED EMBODIMENTS

Figure 1:
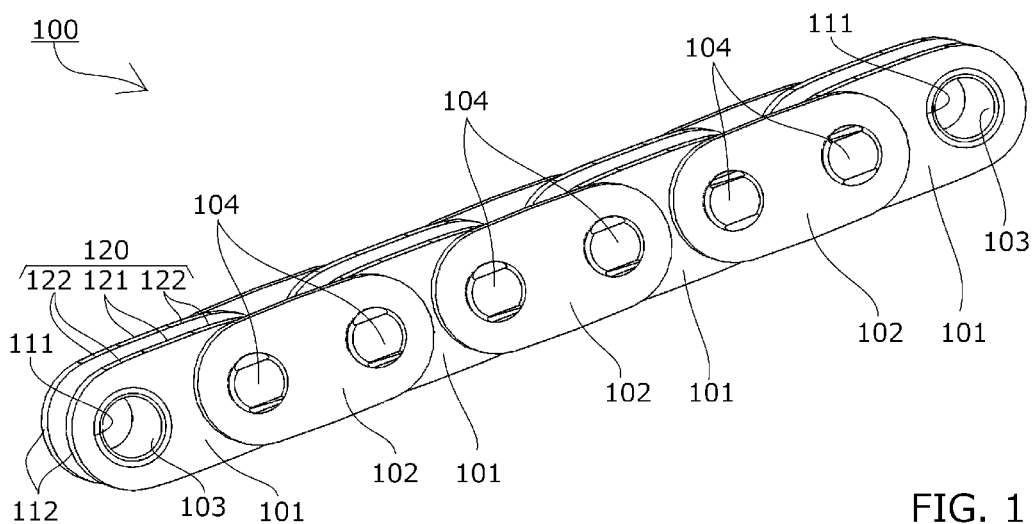
FIG. 1 is a perspective view of a chain according to one embodiment of the present invention.

The chain 100 that uses an inner link plate 101 according to one embodiment of the present invention includes, as shown in FIG. 1, pairs of left and right inner link plates 101, cylindrical bushings 103 with their both ends press-fit in bushing holes 111 that are connection holes of the inner link plates 101, pairs of left and right outer link plates 102 disposed on both outer sides of the inner link plates 101, and connecting pins 104 rotatably inserted in the bushings 103 and having both ends press-fit in pin holes of the outer link plates 102. A large number of these inner link plates 101 and outer link plates 102 are alternately coupled together by the connecting pins 104 along the longitudinal direction of the chain.

Figure 2:
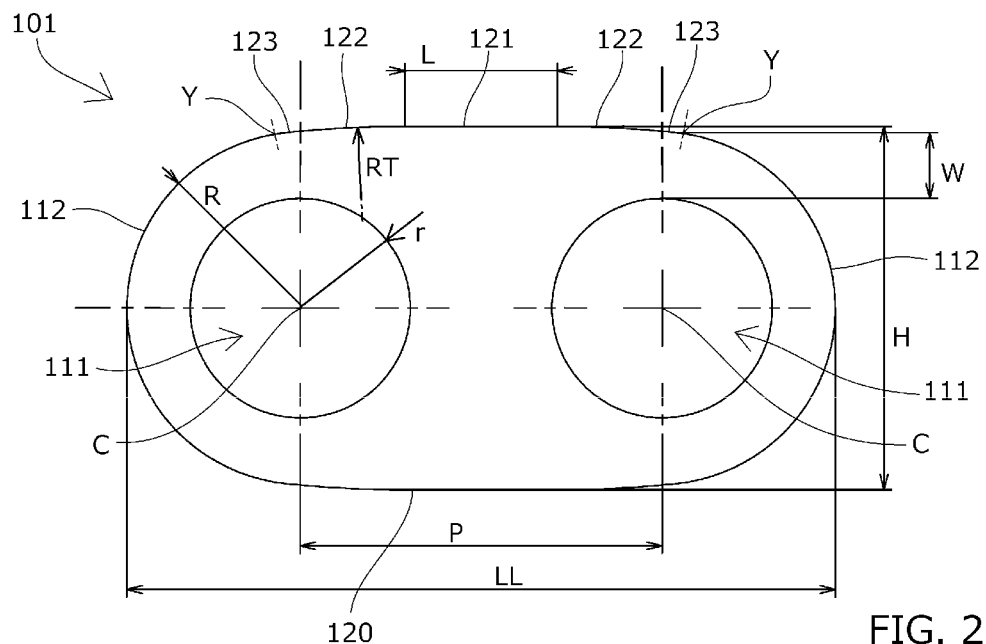
FIG. 2 is a side view of a link plate according to one embodiment of the present invention.

The inner link plate 101 is vertically and horizontally symmetrical as shown in FIG. 1 and FIG. 2. A guide-side end surface 120 is made up of a flat portion 121 formed by a flat surface parallel to a line connecting centers of connection holes 111 at leading and trailing ends, and both end surface portions 122 on both ends in the chain longitudinal direction of the flat portion 121. The both end surface portions 122 are formed to come closer to the line connecting the centers of the leading-end and trailing-end connection holes 111 as the both end surface portions 122 extend further from the flat portion 121.

In this embodiment, the leading and trailing end faces 112 at the leading and trailing ends in the longitudinal direction of the inner link plate 101 are circular arc surfaces having a radius of curvature R, with the centers coinciding with the centers C of the connection holes 111, as shown in FIG. 2.

The both end surface portions 122 and both end surface extensions 123 are circular arc surfaces having a radius of curvature RT. The both end surface portions 122 each have a tangential line coinciding with the flat portion 121 at a connecting point where they connect to the flat portion 121. The both end surface extensions 123 each share the same tangential line with the leading and trailing end faces 112 at their respective boundary points Y.

Therefore, the link plate has no angled part as the flat portion 121 smoothly connects to the leading and trailing end faces 112 via the both end surface portions 122 and both end surface extensions 123.

The flat portion 121 has a length L that is set to 50% or less of the length between the centers C of the leading-end and trailing-end connection holes 111, i.e., the chain pitch P.

The radius of curvature RT of the both end surface portions 122 and both end surface extensions 123 is larger than the distance from the respective centers C of the connection holes 111 to the leading and trailing end edges of the inner link plate 101 on the line connecting the centers of the leading-end and trailing-end connection holes 111, i.e., larger than the radius of curvature R of the leading and trailing end faces 112.

Therefore, the plate width around the connection holes 111 gradually increases from the boundary points Y toward the respective both end surface extensions 123. Directly above the center C of the connection hole 111, the plate width W is larger than R−r (W>R−r), where r is the radius of the connection hole 111.

The distance from the flat portion 121 to the line connecting the centers of the leading-end and trailing-end connection holes 111, i.e., a half of the height H of the inner link plate 101 (H/2) is longer than the distance from the respective centers C of the connection holes 111 to the leading and trailing end edges of the inner link plate 101 on the line connecting the centers of the leading-end and trailing-end connection holes 111, i.e., the radius of curvature R of the leading and trailing end faces 112.

The link plate has an enhanced tensile strength because of these dimensions.

The dimensions of the inner link plate of this embodiment are summed up as follows:

$$LL=P+2R$$

$$L \leq P/2$$

$$R<H/2$$

$$R<RT$$

$$R-r<W$$

LL: Front to back length of plate

P: Chain pitch (length between centers C of connection holes 111)

R: Radius of curvature of leading and trailing end faces 112 (distance from respective centers C of connection holes 111 to leading and trailing end edges of the inner link plate 101 on the line connecting the centers C of the connection holes 111 at leading and trailing ends)

L: Length of flat portion 121

H: Height of inner link plate 101 (twice the distance from the flat portion 121 to the line connecting the centers C of the connection holes 111 at leading and trailing ends)

RT: Radius of curvature of both end surface portions and both end surface extensions W: Plate width directly above centers C of connection holes 111 r: Radius of connection hole 111

While it is assumed here that the center of the radius of curvature R of the leading or trailing end face 112 is the center C of the connection hole 111 in the embodiment shown in FIG. 2, if the front to back length of the plate LL were made constant and the length L of the flat portion 121 were changed, the radius of curvature R of the leading or trailing end face 112 and the center position would be changed accordingly.

In this case, it suffices if the conditions other than LL=P+2R of the conditions above are satisfied.

Figure 3:
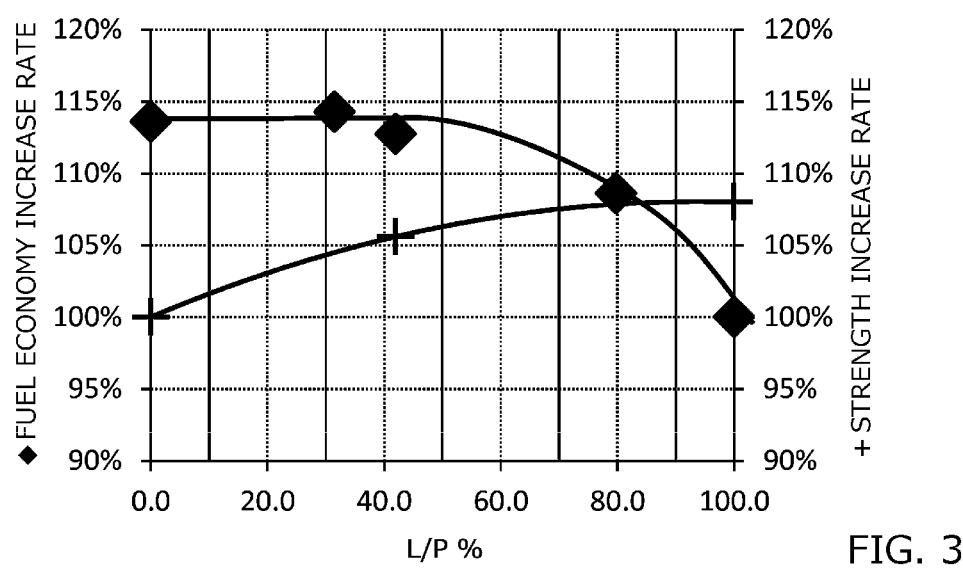
FIG. 3 is a test graph of the chain according to the present invention.

FIG. 3 shows experimental data indicating fuel economy increase rates (mostly dependent on frictional resistance associated with the length of the flat portion 121) and strength increase rates (mostly dependent on the plate width directly above the centers C of the connection holes 111)

when the chain 100 that uses the inner link plates 101 configured as described above is used for an engine timing system.

All the link plates have the same chain pitch (length between the centers C of the connection holes 111) P, height H of the inner link plates 101, and front to back length LL of the plates, but different lengths L of the flat portion 121.

The chain known from Japanese Patent Application Laid-open No. 2012-255523 mentioned in the foregoing having link plates with guide-side end surfaces convexly curved is used as L/P=0%, L/P being the ratio of the length L of the flat portion 121 to the chain pitch (length between the centers C of the connection holes 111) P. The graph plots the strength increase rates relative to that of this chain with L/P=0%.

The chain with L/P=100% is a common chain that uses link plates having entirely flat guide-side end surfaces. The graph plots the fuel economy increase rates relative to that of this chain with L/P=100%.

As can be seen from the experimental data, the strength increase rate improves substantially linearly as L/P becomes larger.

This is because the longer the length L of the flat portion 121 is, the larger the plate width W directly above the centers C of the connection holes 111 becomes, if the height H of the inner link plates 101 and the front to back length LL of the plates are the same.

On the other hand, the fuel economy increase rate remains high as L/P is increased until L/P reaches around 50%. After L/P exceeds 50%, the fuel economy increase rate drops rapidly.

This indicates that the friction resistance hardly increases to an extent that causes deterioration of fuel economy in comparison to link plates with convexly curved guide-side end surfaces even if there is a flat portion to some degree in a normal environment of use where there is lubricating oil and the guide member undergoes surface deformation due to the influence of surface pressure.

While the embodiment described above is applied to the inner link plate 101, the outer link plates 102 that are brought into sliding contact with the guide member may also have a similar configuration.

While the link plate has been described as being vertically and horizontally symmetrical as viewed from one side as shown in FIG. 2, the link plate may be designed horizontally asymmetrical in a case where the link plates have the sliding contact parts that make sliding contact with guide members only on one side, such as when the link plates are used in a silent chain, for example.

Further, the link plate may be designed vertically asymmetrical in cases where the traveling direction is specified, or in order to make the characteristics in one traveling direction different from those in the other direction.

While the both end surface portions 122 and both end surface extensions 123 have been described as being curved surfaces having the same radius of curvature RT, they may be curved surfaces having different radii. Alternatively, the both end surface portions 122 and both end surface extensions 123 may be formed as inclined flat surfaces, or curved surfaces with varying radii.

Similarly, while the leading and trailing end faces 112 have been described as being curved surfaces having a radius of curvature R, they may be formed by a combination of flat surfaces, or curved surfaces with varying radii. Alternatively, the leading and trailing end faces may be formed by curved surfaces with varying radii continuously from the both end surface extensions 123.

Furthermore, while it is desirable to form the respective boundaries between the flat portion 121 and the both end surface portions 122, between the both end surface portions 122 and the both end surface extensions 123, and between the both end surface extensions 123 and the leading and trailing end faces 112 smoothly continuous, the boundaries may also include an angled part that is either protruded or recessed (including small rounded or cornered connecting portions).

The invention claimed is:

1. A link plate comprising: connection holes at leading and trailing ends; a sliding contact part that makes sliding contact with a guide member; the sliding contact part comprising a guide-side end surface in an area between centers of the leading-end and trailing-end connection holes along a chain longitudinal direction on one side where the link plate has the sliding contact part, the guide-side end surface of the link plate including a flat portion formed by a flat surface parallel to a line connecting centers of the leading-end and trailing-end connection holes, and both end surface portions on both ends in the chain longitudinal direction of the flat portion, the both end surface portions being formed to come closer to the line connecting the centers of the leading-end and trailing-end connection holes as the both end surface portions extend further from the flat portion.

2. The link plate according to claim 1, wherein a distance (H/2) from the flat portion to the line connecting the centers of the leading-end and trailing-end connection holes is longer than a distance (R) from respective centers of connection holes to leading and trailing end edges of the link plate on the line connecting the centers of the leading-end and trailing-end connection holes.

3. The link plate according to claim 1, wherein the both end surface portions are a curved surface having a predetermined radius of curvature (RT), the radius of curvature (RT) of the both end surface portions being longer than a distance (R) from respective centers of connection holes to leading and trailing end edges of the link plate on the line connecting the centers of the leading-end and trailing-end connection holes.

4. The link plate according to claim 1, wherein the flat portion has a length (L) along the chain longitudinal direction that is 50% or less of a length (P) between the centers of the leading-end and trailing-end connection holes.

5. The link plate according to claim 1, wherein the both end surface portions have a connecting point with the flat portion where the both end surface portions each smoothly continue from the flat portion, the flat portion being a tangential line at the connecting point.

6. A chain comprising: a pair of left and right inner link plates; and a pair of left and right outer link plates each disposed on both outer sides of the pair of left and right inner link plates, a multiplicity of the inner link plates and the outer link plates being alternately coupled together by connecting pins along a chain longitudinal direction, the pairs of left and right inner link plates including the link plate according to claim 1.

\* \* \* \* \*